Figure 1:
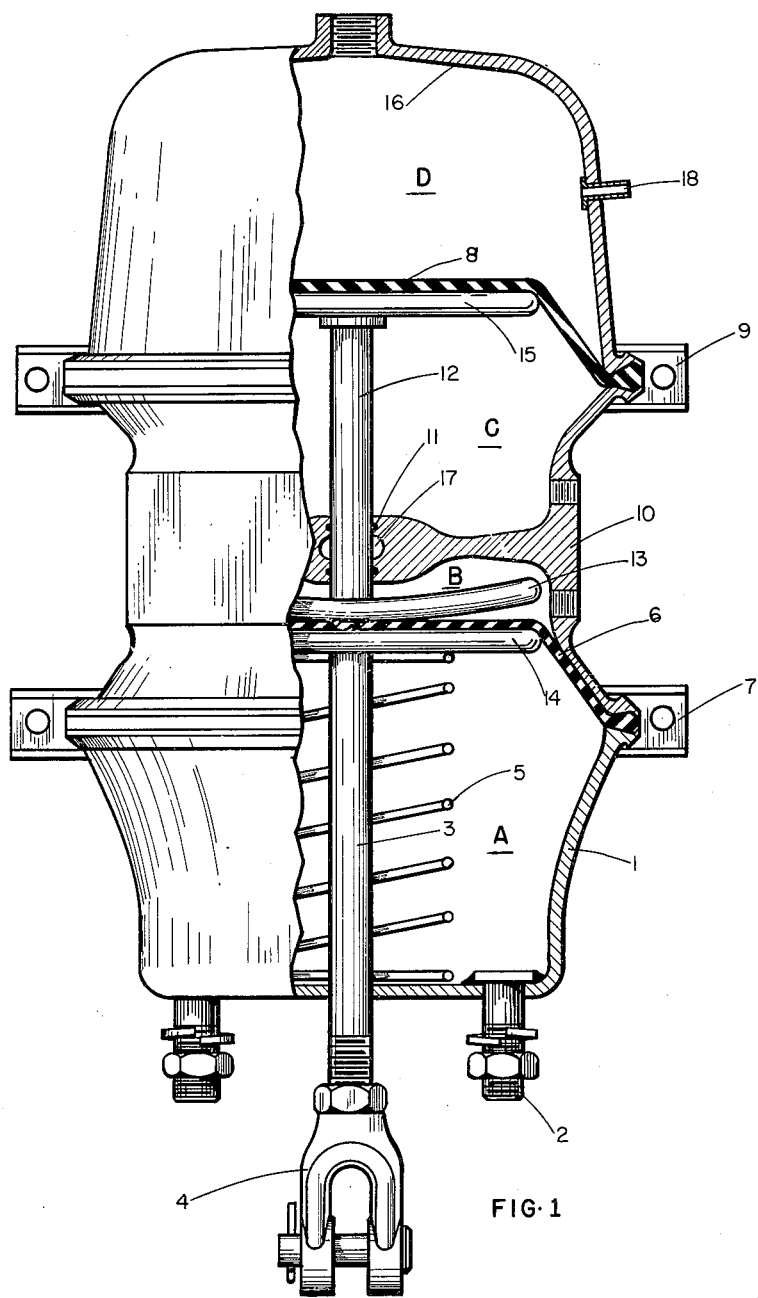

INVENTOR.
ARNOLD H. HOFFER

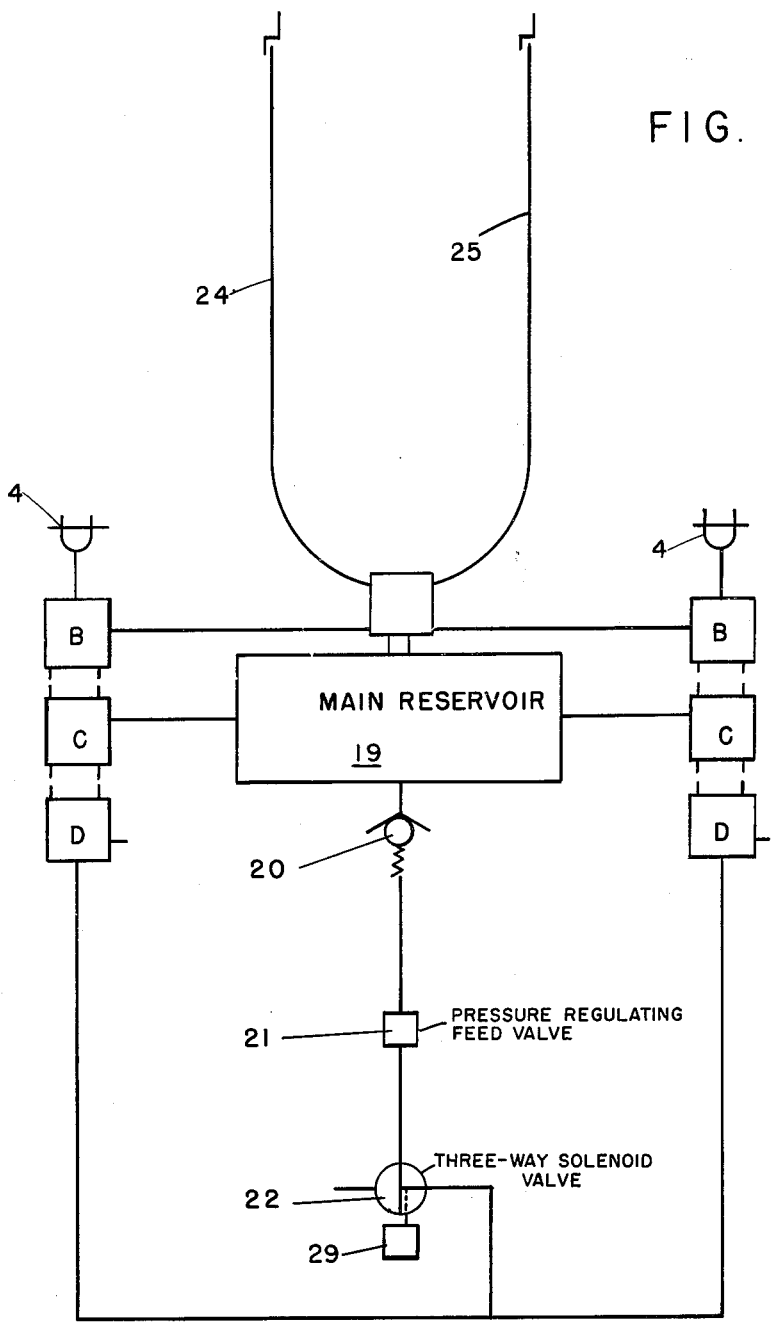

United States Patent Office 3,205,785
Patented Sept. 14, 1965

3,205,785
SAFETY BRAKE ACTUATING DEVICE
Arnold H. Hoffer, 72 Kibler Drive, Girard, Pa.
Filed Jan. 24, 1963, Ser. No. 253,668
3 Claims. (Cl. 91—170)

This invention relates to air brake systems in general and, more particularly, to automotive air brakes such as are used on trucks, buses, and trailers and, even more specifically, to that type of air brake which has built into it parking and emergency features, somewhat like the spring brake.

The conventional air brake system found on the majority of vehicles today depends upon a good supply pressure in order to assure effective operation. Should anything disrupt this air supply, the vehicle loses its braking ability and the results can be disastrous. For example, should a vehicle be travelling at high speeds and lose its air supply due to some failure in the system, the resulting runaway could prove to be serious. Again, should a vehicle be parked in hilly terrain and its air supply bleed away, the vehicle is left without brakes, and the resulting runaway could prove to be a great hazard.

Virtually since the first air brakes were applied to high speed vehicles, operators have been seeking a way to overcome this weakness inherent in the present system. One solution to the problem is shown in Patent No. 2,854,954. This patent shows a compressed mechanical spring in series with each air brake plunger and held in place with air pressure from the main reservoir supply. When the supply failed, there was no longer any air to hold the spring in place so it travelled forward, acted against the air brake plunger, and mechanically applied the brakes.

With the greater clamor from the public for greater protection from runaway vehicles which had lost their brakes and caused great losses to life and property, law enforcement agencies began to insist that a better brake system be developed. Many manufacturers were quick to fall upon the idea of the spring brake as it has come to be known and at least half a dozen different varieties are available on the market today.

The spring brake itself, however, while better than nothing at all, has many inherent disadvantages, for example:

The spring brake is heavy, increasing the tare weight of the vehicle, but which is worse, this weight is unsprung. As this unsprung mass bounces down the highway, it induces high inertia loads on the pieces associated with it which can result in erosion and fatituge and consequent failure of the brake.

Most spring brakes contain pre-compressed mechanical coil spring which present a real safety hazard to the operator who tries to service or overhaul them. Some of these booby traps have been known to injure even experienced servicemen.

Most spring brakes contain sliding pistons which have a tendency to stick in cold weather and to become inoperative when flying debris from the road indents their cylinder walls.

Most spring brakes are very difficult to release once the air supply is lost. Some spring brakes have no means of release other than by a new air supply. Others have various means of threaded arrangements by which the spring can be re-compressed manually by means of wing nuts or wrenches; however, this means is crude, tedious, and cumbersome.

Most spring brakes are rather low in spring force because higher energy spring become even heavier and more voluminous than the present spring.

Recognizing the inadequacy of the brake systems which are presently on the market, the present invention discloses a new air brake system which overcomes all of the above listed objections. This new system automatically senses any failure of the main air supply and automatically, but gradually, applies the brakes. This new system is compatible with existing air brake systems, light in weight, compact in size, low in cost, and easy to install and service; yet, it is simple, reliable, foolproof, and failsafe.

It is, therefore, an object of the present invention to provide such a system as will meet all of the last mentioned characteristics.

Another object is to provide an improved actuating device for actuation brakes.

With the above and other objects in view, the present invention consists of the combination and arrangement of parts hereinafter more fully described, illustrated in the accompanying drawings and more particularly pointed out in the appended claims, it being understood that changes may be made in the form, size, proportion and minor details of construction without departing from the spirit or sacrificing any of the advantages of the invention.

In the drawings:

FIG. 1 is a side view partly in longitudinal cross section of an air brake actuating device according to the invention; and FIG. 2 is a schematic diagram of the actuating mechanism for the brake device.

The basic and novel component in this invention is principally a multiple air motor as shown in FIG. 1 in one of its forms and which is designed to replace the conventional air brake chamber so commonly found today. This multiple air motor is similar in some respects to two conventional brake chambers connected together mechanically in series. This results in four interdependent chambers.

The first chamber, which shall be referred to as the brake chamber A, is identical to the similar section of a conventional air brake chamber. The second chamber, which shall be referred to as the service chamber B, is similar to the service chamber of a conventional air brake chamber except that it also contains a plunger which can move, and, in so doing, activates the brake plunger. The third chamber, which shall be referred to as the reservoir chamber C, is similar in principle to the reservoir chamber in the spring brake. This chamber C, is connected to the main air reservoir and continually senses the pressure in that reservoir. The fourth chamber, which shall be referred to as the safety chamber D, is actually a new air chamber in which may be stored a predetermined mass of air. It is this safety chamber or air spring which is one of the novel features of this invention.

To illustrate how this multiple are motor operates, let us take an example where it is applied on a truck whose main reservoirs are governed to carry a pressure of, for instance, one hundred pounds per square inch (p.s.i.). In normal operation, as the truck's air compressor charges the main reservoir, it will also charge the reservoir chamber C to the same pressure. With the chamber C charged to one hundred p.s.i., let us independently charge the safety chamber D to, say, eight-five p.s.i. Since the pressure is greater in chamber C than chamber D, the diaphragm therebetween favors the safety chamber D and does not bear on the brake plunger. If one desires to apply the air brakes, all that need be done is to allow air under pressure to enter the service chamber B. This bears down on the brake plunger in the conventional manner, applying the brakes. If there is a failure of the reservoir line, the service line, the service chamber diaphragm, or any other component in the system which would cause a loss in air pressure in the reservoir chamber C, then the excess pressure in the safety chamber D bears down on its floating plunger which, in turn, bears down on the brake plunger which applies the brakes, all automatically and without further attention by the operator.

In order to prevent the safety brakes from being applied too quickly, catching the operator unaware and perhaps setting up a traffic hazard, the rate of air flow from the reservoir chamber C is limited by an appropriately sized orifice. This allows a positive but gentle application of the safety brakes.

FIG. 1 shows one form which this invention could take. This form makes it adaptable to a conventional air brake chamber. When the back plate is removed from a conventional air brake chamber made of a hollow cup like member, parts 1 to 7 are all that remain. A brake chamber base 1 is bolted securely to the axle by bolts 2. A brake plunger rod 3, when motivated forward by an application of air pressure in the service chamber B, applies force on a clevis 4. The clevis 4, in turn, applies a force on the brake lever which, in turn, applies the brakes. When the air is exhausted from the service chamber B, a return spring 5 returns the brake plunger rod 3 and its diaphragm 6 to the normal position as shown. The remainder of the parts shown replace the conventional pressure plate and are clamped into place by a clamp 7.

To reduce the number of new parts required to service this new brake, a diaphragm 8 is provided similar to the diaphragm 6, and a clamp 9 is provided similar to the clamp 7.

Clamped securely to the base 1 is a housing 10 which serves several purposes. First, the housing 10 forms a new service chamber B to replace the one which was removed, allowing this much of the air brake to function in the conventional manner. Secondly, it forms part of the new reservoir chamber C which is connected to the main reservoir. Finally, it serves as a barrier to isolate the service chamber B from the reservoir chamber C by means of a sealing device 11. This barrier houses and guides a safety brake plunger 12, A safety plunger plate 13 is intentionally made curved to allow for the roll of a brake plunger plate 14 as it traverses its arc when the brakes are applied. A plate 15 drives the plate 14. A cover cup 16 forms the safety chamber D. Its shape is such as to hold a predetermined volume of air. This volume is such that when the safety chamber D is filled with air at a pressure equal to that in the main reservoir at its lowest governed point, there is still adequate pressure in the safety chamber D when the safety plunger 12 has advanced and put the brakes on to develop the force to make the brakes hold. For example, the volume could be made such that starting with eight-five p.s.i. in the retracted position, it will not fall below sixty p.s.i. in the advanced position, since sixty p.s.i. is the design point of most conventional brake systems.

A lubricant cavity 17 could be supplied in the housing 10 in order to lubricate the sealing device 11. There are many schemes by which this air spring known as the safety chamber D can be charged with air. These will be explained later but one of the simplest would be to charge this chamber through an inlet valve 18 like that commonly found on a tire tube. In this way, the safety chamber D can be charged to any predetermined valve by an air hose and tire gauge. Should the operator decide to release the automatic brakes as is sometimes desired by an operator who wishes to jockey a parked trailer around in a loading yard, then all that is required is to let the air out of the safety chambers through the valve 18.

There are various schemes by which the safety chambers can be inflated to a predetermined value. One is manually as described above. Another would be to supply it from a main reservoir 19 connected to the main air compressor by lines 24 and 25, then through a spring loaded check valve 20, and a pneumatic feed valve 21, and a three-way valve 22 shown in FIG. 2. The spring loaded check valve 20 (which is generally required by law) makes certain that air will only flow into this auxiliary circuit after the pressure in the main reservoir has been built up to sixty-five p.s.i. This provision is made to assure that the service brake system will be provided for before any air is bled away to feed auxiliary functions. The air then passes on to the pressure regulating feed valve 21 which assures that the air pressure in the safety chamber D will always be equal to that called for by the setting on the feed valve 21; for instance, eighty-five p.s.i. The means for operating the feed valve 21 is such that if the pressure in the safety chamber D falls below the present value, the feed valve admits more air to the safety chamber. If the pressure in the safety chamber tries to exceed the present value, then the feed valve exhausts the excess air.

The reason for incorporating a thre-way valve into the safety chamber circuit is to allow the operator to bleed off the safety chamber at his discretion, as is sometimes required for jockeying vehicles around in a storage yard.

This three-way valve 22 may be of the manual type or it can be of the electro-pneumatic remote controlled type actuated by an electrical actuator 29. The valve 22 may be of a common type of electrically actuated three-way valve familiar to those skilled in the art. If it is of the latter type, it should be installed so that it will be failsafe. That is, when the valve is de-energized, it will be normally open, allowing air to flow freely through it from the feed valve to the safety chamber or vice versa. When the valve is energized, it cuts off the flow of air from the feed valve and exhausts the air from the safety chamber. The electrical control for this three-way valve could be mounted in the cab of the vehicle so that the operator could operate it at his discretion.

In a review of the present state of the art, it is noted that most of the failsafe brakes on the market today are a manifestation of the spring brake disclosed in Patent No. 2,409,908. Here, a heavy system of mechanical springs is employed to actuate the brake levers in the event of a loss of air pressure in the main reservoir. In the present invention, these springs were rejected and replaced by a safety reservoir and diaphragm charged with air to a predetermined pressure. Compressed air acting on the diaphragm acts as an air spring.

The air spring has some inherent advantages over the mechanical spring. It is lighter and less costly. It is also easier to service and eliminates the hazard of an exploding precompressed mechanical spring during overhaul.

Should it be desired to release the spring pressure to remove the brakes when a vehicle has lost its air supply, the process is long and tedious and even dangerous, however, to release the brake pressure resulting from an air spring, as in the present invention, all that is necessary is to simply discharge the air from the air spring or safety chamber D. This may be done locally through the valve on the chamber or remotely through a three-way valve.

The foregoing specification sets forth the invention in its preferred practical forms but it is understood that the structure shown is capable of modification within a range of equivalents without departing from the invention which is to be understood is broadly novel as is commensurate with the appended claims.

The embodiments of the invention in which an exclusive property or privilege is claimed are defined as follows:

1. An auxiliary air brake system adapted to be connected to the brakes of an air brake system of a vehicle having air brake actuating means comprising a main air reservoir, a chamber sensitive to air pressure in said main air reservoir, a safety chamber, connecting means connecting air from said main air reservoir to said safety chamber, mechanical connecting means connected to said actuating means and to said safety chamber and responsive to air pressure in said safety chamber and to air pressure in said main reservoir to actuate said air brakes when said air pressure in said main air reservoir falls below a predetermined value, said connecting means comprising a spring loaded check valve, a pressure regulating valve, and said safety chamber, said safety chamber being adapted to be charged to a predetermined value by air from said main reservoir feeding it through said spring loaded check valve, and a pressure regulating feed valve, said spring loaded check valve being connected to assure said safety chamber that air will not escape therefrom in the event of a failure of said mechanical connecting means.

2. The air brake system recited in claim 1 wherein a system of valves is provided connected to feed said safety chamber, said valves including a three-way air valve, one port of said three-way valve being connected to said feed valve, one port connected to said safety chamber, and one port able to exhaust atmosphere, said system of valves, when in the normal position, allowing air to flow freely through said three-way valve from said feed valve to said safety chamber while said exhaust port is closed thereof, said valves having means whereby the operator may operate said three-way valve which, in turn, blocks off the air supply from said feed valve and exhausts said safety chamber to atmosphere.

3. The air brake system recited in claim 2 wherein said three-way valve has an electrical solenoid thereon for actuating said three-way valve.

References Cited by the Examiner

UNITED STATES PATENTS

| 2,163,982 | 6/39 | Mercier | 92—107 |
| 2,754,805 | 7/56 | Beman | 92—94 |
| 2,854,954 | 10/58 | Howze | 92—64 |
| 2,871,927 | 2/59 | Euga | 92—63 |
| 2,936,785 | 5/60 | Hastings | 92—63 |
| 2,976,085 | 3/61 | Grogan | 92—63 |
| 3,064,685 | 11/62 | Washnock et al. | 92—63 |
| 3,090,359 | 5/63 | Hoppenstand | 92—63 |

FOREIGN PATENTS

| 563,954 | 1/58 | Belgium. |
| 1,022,855 | 1/58 | Germany. |

FRED E. ENGELTHALER, *Primary Examiner.*

SAMUEL LEVINE, *Examiner.*